(12) United States Patent
Vega et al.

(10) Patent No.: US 10,993,075 B2
(45) Date of Patent: Apr. 27, 2021

(54) LOCATION HISTORY ACCESS FOR LOST TRACKING DEVICE

(71) Applicant: Tile, Inc., San Mateo, CA (US)

(72) Inventors: Jose Pons Vega, Belmont, CA (US); Daniel Tam, San Francisco, CA (US)

(73) Assignee: Tile, Inc., San Mateo, CA (US)

( * ) Notice: Subject to any disclaimer, the term of this patent is extended or adjusted under 35 U.S.C. 154(b) by 0 days.

(21) Appl. No.: 16/517,425

(22) Filed: Jul. 19, 2019

(65) Prior Publication Data

US 2019/0342710 A1   Nov. 7, 2019

Related U.S. Application Data

(63) Continuation of application No. 16/132,186, filed on Sep. 14, 2018, which is a continuation of application
(Continued)

(51) Int. Cl.
| | | |
|---|---|---|
| H04W 4/02 | (2018.01) | |
| H04W 64/00 | (2009.01) | |
| H04W 4/80 | (2018.01) | |
| G01S 5/00 | (2006.01) | |
| G01S 19/16 | (2010.01) | |

(52) U.S. Cl.
CPC ............... *H04W 4/023* (2013.01); *G01S 5/00* (2013.01); *G01S 19/16* (2013.01); *H04W 4/80* (2018.02); *H04W 64/00* (2013.01)

(58) Field of Classification Search
CPC ....... H04W 4/029; H04W 4/80; H04W 4/026; H04W 4/027; H04W 4/025; H04W 76/19; H04W 76/25
See application file for complete search history.

(56) References Cited

U.S. PATENT DOCUMENTS 6,845,318 B1 * 1/2005 Moore .................. G01C 21/20
                                                                   340/990
8,643,486 B2    2/2014 Hess
(Continued)

FOREIGN PATENT DOCUMENTS

KR      10-1161097         6/2012
WO   WO 2016/080986 A1   5/2016

OTHER PUBLICATIONS

PCT International Search Report and Written Opinion, PCT Application No. PCT/US2016/058942, dated Feb. 8, 2017, 10 pages.
(Continued)

*Primary Examiner* — Kwasi Karikari
(74) *Attorney, Agent, or Firm* — Fenwick & West LLP

(57) ABSTRACT

A tracking device can securely communicate with a secondary device. The secondary device can provide locations associated with the tracking device to a tracking system. When the secondary device determines that the tracking device is lost (for instance, in response to no longer receiving communications from the tracking device), the secondary device can provide additional locations associated with the secondary device to the tracking system. The tracking system can store locations received before and after the tracking device was lost, and can provide these locations to the user for display within a map interface, enabling a user to digitally retrace the user's steps in order to aid the user in locating the lost tracking device.

18 Claims, 7 Drawing Sheets

Related U.S. Application Data

No. 14/937,887, filed on Nov. 11, 2015, now Pat. No. 10,111,032.

(56) References Cited

U.S. PATENT DOCUMENTS

| | | |
|---|---|---|
| 2002/0121975 A1 | 9/2002 | Struble et al. |
| 2006/0109109 A1 | 5/2006 | Rajapakse et al. |
| 2007/0290924 A1 | 12/2007 | McCoy |
| 2010/0064239 A1 | 3/2010 | Crawford et al. |
| 2011/0173193 A1* | 7/2011 | Ahn .................... G06F 16/2428 707/725 |
| 2013/0214909 A1 | 8/2013 | Meijers et al. |
| 2013/0326642 A1 | 12/2013 | Hajj et al. |
| 2014/0066104 A1 | 3/2014 | Alfaro et al. |
| 2014/0162701 A1 | 6/2014 | Jellinek et al. |
| 2014/0173439 A1 | 6/2014 | Gutierrez et al. |
| 2014/0191868 A1 | 7/2014 | Ortiz et al. |
| 2014/0213301 A1* | 7/2014 | Evans .................... H04W 4/029 455/456.3 |
| 2014/0266756 A1* | 9/2014 | Young .................... G08B 21/24 340/686.6 |
| 2014/0282040 A1 | 9/2014 | Alfaro |
| 2014/0327518 A1* | 11/2014 | Loutit .................... G05B 19/00 340/7.58 |
| 2015/0066557 A1 | 3/2015 | Lichti |
| 2015/0070191 A1 | 3/2015 | Westick |
| 2015/0163626 A1 | 6/2015 | Zimmer |
| 2017/0325065 A1 | 11/2017 | Azam et al. |

OTHER PUBLICATIONS

United States Advisory Action, U.S. Appl. No. 14/937,887, dated May 2, 2018, 5 pages.

United States Office Action, U.S. Appl. No. 14/937,887, dated Jan. 2, 2018, 28 pages.

United States Office Action, U.S. Appl. No. 14/937,887, dated Jun. 6, 2017, 27 pages.

United States Office Action, U.S. Appl. No. 14/937,887, dated Mar. 14, 2018, 28 pages.

United States Office Action, U.S. Appl. No. 14/937,887, dated Sep. 6, 2017, 28 pages.

United States Office Action, U.S. Appl. No. 16/132,186, dated Mar. 14, 2019, 10 pages.

* cited by examiner

LOCATION HISTORY ACCESS FOR LOST TRACKING DEVICE

CROSS REFERENCE TO RELATED APPLICATIONS

This application is a continuation of U.S. application Ser. No. 16/132,186, filed Sep. 14, 2018, now U.S. Pat. No. 10,412,548, which is a continuation of U.S. application Ser. No. 14/937,887, filed Nov. 11, 2015, now U.S. Pat. No. 10,111,032, which is incorporated by reference in its entirety.

BACKGROUND

This disclosure relates generally to locating a tracking device, and more specifically, to providing a location history for a lost tracking device that allows a digital retracing of the locations of the tracking device.

Electronic tracking devices have created numerous ways for people to track the locations of people and/or objects. For example, a user can use GPS technology to track a device remotely or to determine a location of the user. In another example, a user can attach a tracking device to an important object, such as keys or a wallet, and use the features of the tracking device to more quickly locate the object, (e.g., if it becomes lost).

However, traditional tracking devices and corresponding systems suffer from one or more disadvantages. For example, traditional tracking devices provide only a last known location of a tracking device. The tracking device may have been lost a long time before the user realizes of the lost tracking device, or may have been lost a long time after the last known location of the device was determined. Further, a user may have forgotten the route taken by the user when the tracking device was lost, making retracing the steps of the user more difficult.

SUMMARY

A tracking device can securely communicate with a secondary device, such as a mobile phone or computer, using a one-way communication protocol. For instance, the tracking device can generate a hash value based on the identity of the tracking device, a time interval during which the hash value is generated, or any other tracking device parameters. The tracking device can output the generated hash value, for instance as a Bluetooth-format advertisement or broadcast that is received by the secondary device.

The secondary device can receive the hash value, and can attempt to resolve the received hash value. In addition to resolving the identity of the tracking device, the secondary device can determine a location of the tracking device (such as a location of the mobile device if the mobile device is within threshold proximity of the tracking device). The secondary device can provide the identity of the tracking device and the determined location to a tracking server (such as a cloud server). Along with the determined location, the secondary device sends a timestamp and a flag indicating that the determined location is a pre-lost location of the tracking device.

If a secondary device loses communication with the tracking device (e.g. the secondary device does not receive communications for a predetermined threshold time), the secondary device classifies the tracking device as "lost", and turns on its location services. The secondary device keeps track of locations of the secondary device at a regular interval of time after classifying the tracking device as lost, and provides one or more of the determined locations, timestamp and the approximate distance of the mobile device from the last known location of the tracking device to the tracking server. Additionally, along with providing each determined location, the secondary device can provide an associated flag indicating that the location was determined after the tracking device was lost.

Once a tracking device is marked as lost by a user of the mobile device, the mobile device sends a request to the tracking server to retrieve the location history for the tracking device. The tracking server uses the identity of the received tracking device to retrieve the stored location information associated with received tracking device identity (including the locations of the tracking device before it was lost, and the locations of the secondary device after the tracking device was lost). The tracking server returns a location history associated with the tracking device. The location history includes one or more locations of the tracking device or the secondary device. The location information can include the tracking device identity, a location, a timestamp associated with the location and a flag indicating a pre-lost or a post-lost location. If the location is pre-lost, the location is associated with the tracking device. If the location is post-lost, the location is associated with the secondary device.

Once the secondary device receives the location history, the secondary device displays the location information via a user interface. The user interface includes a digital map. The last known location of the tracking device is marked on the map (for instance, by a pin of a first color). Pre-lost locations can be represented on the map by pins of a second color, and post-lost locations can be represented on the map by pins of a third color. The location history shown on the digital map creates a digital retrace of the pre-lost and post-lost locations of the tracking device and the associated secondary device. The user interface can include a slider that can be operated using touch gestures. The slider is placed on a timeline representing the location history, and can be adjusted by a user to select a timeframe associated with the location history. In response, the pins representing the locations of the tracking device or the secondary device corresponding only to locations associated with times within the selected timeframe are displayed on the map interface.

Figure 1:
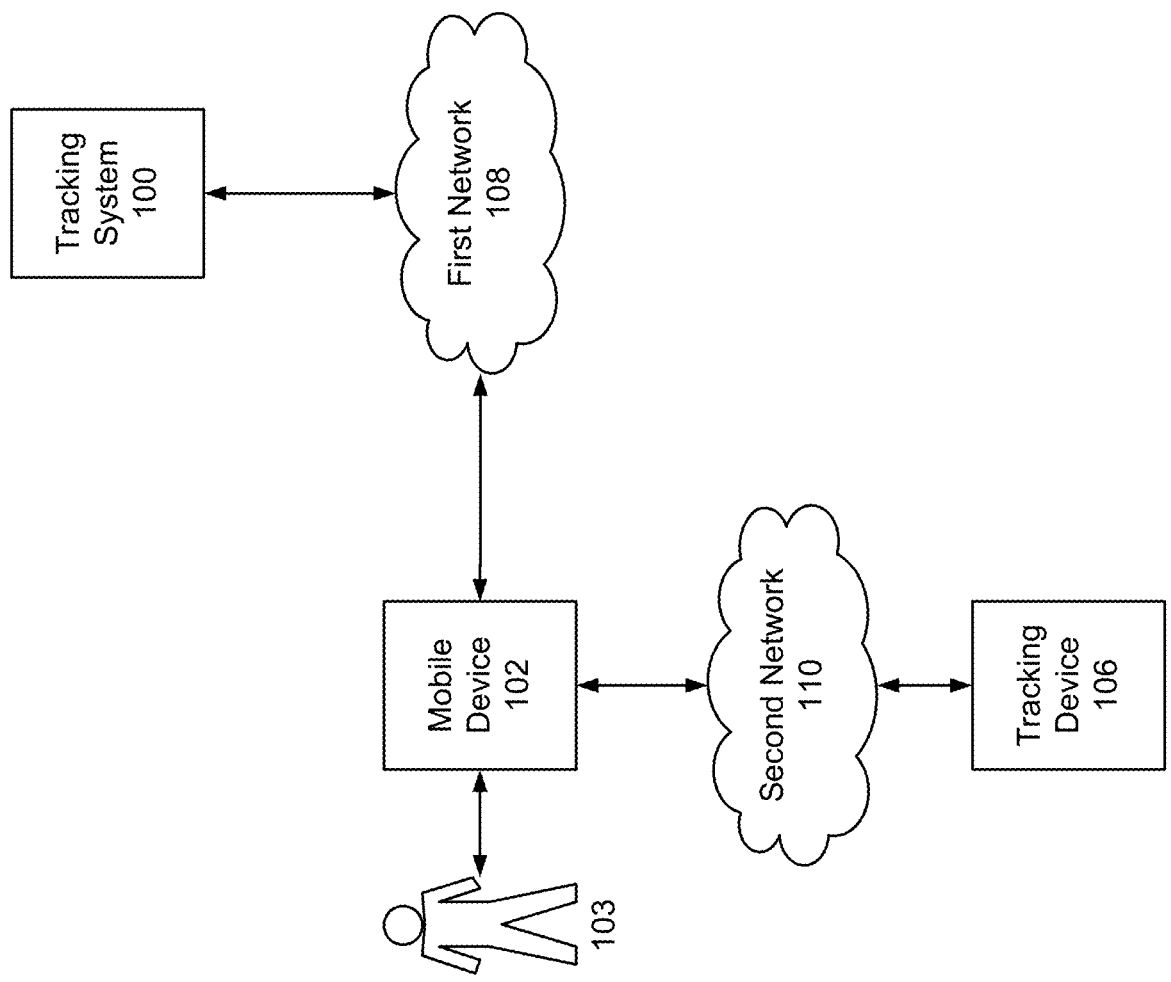
FIG. 1 illustrates a tracking device environment, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments described herein provide a user with the ability to locate one or more low-power tracking devices by providing a digital retrace of the locations (e.g. location history) of the tracking device and the mobile device.

A user can attach a tracking device to or enclose the tracking device within an object, such as a wallet, keys, a car, a bike, a pet, or any other object that the user wants to track. The user can then use a mobile device (e.g., by way of a software application installed on the mobile device) to track the tracking device and corresponding object. For example, the mobile device can perform a local search for a tracking device attached to a near-by object. However, the tracking device may lose connection with the mobile device (e.g., if the tracking device is beyond a distance within which the mobile device and the tracking device can communicate). It may be a long time before the user realizes of the loss of connection with the tracking device, and the user may be a long distance from the tracking device before the user becomes aware of the lost connection. The principles described herein allow the user to retrieve and view the location history of the lost tracking device and the locations of the mobile device.

In particular, a tracking system (also referred to herein as a "cloud server" or simply "server") can maintain a location history of each tracking device associated with a user of the system. The tracking system can associate each user within the system with one or more tracking devices associated the user (e.g., tracking devices that the user has purchased and is using to track objects owned by the user). The mobile device periodically receives communication packets from the tracking device (including, for example, hash values representative of the identity of the tracking device). The mobile device uploads the tracking device identity along with the location of the tracking device (or an approximate or proxy location of the tracking device, such as the location of the mobile device) and a timestamp to the tracking server. Along with the location of the tracking device, the mobile device can send a flag to the tracking server indicating that the location is associated with a tracking device (a "pre-lost" location).

If the tracking device does not send out the periodical hash value, it is possible that the user of the mobile device may have stepped out of the range of the tracking device, and thus lost communication with the tracking device. The mobile device turns on location detection functionality (such as a GPS receiver) and periodically sends the location of the mobile device to the tracking system. Along with the location of the mobile device, the mobile device sends a flag to the tracking server indicating that the location is a location associated with a mobile device that has not received a communication from the tracking device in a threshold amount of time (a "post-lost" location, indicating that the tracking device has been lost).

The user of the mobile device may not realize that they've lost the tracking device for a period of time. When the user realizes that the tracking device is lost (or forgotten, or stolen), the user can send an indication that the tracking device is lost to the tracking system. The tracking system can set a flag indicating the tracking device is lost.

When the user marks the tracking device as lost, a request is sent to the tracking server to retrieve the location history of the tracking device. As used herein, "location history" refers to one or more of a last known location of the tracking device, a set of pre-lost locations of the tracking device, and a set of post-lost locations of the tracking device. The tracking server identifies the flagged tracking device as lost, retrieves the location history of the tracking device, and presents the location history to the user on the mobile device (or other computing device). The location history is presented on a map interface illustrating locations associated with the location history on a map, and can include a timeline slider interface. When the user adjusts the slider to correspond to a particular timeframe, the locations within the location history corresponding to the timeframe are presented on the map. Additionally, each location indicator may be color coded based on whether the corresponding location is a pre-lost location or a post-lost location.

Environment Overview

FIG. 1 illustrates a tracking device environment, according to one embodiment. In the embodiment of FIG. 1, a tracking system 100 is communicatively coupled to a mobile device 102 associated with the user 103 via a first network 108. As will be explained in more detail below, the tracking system 100 can allow the user 103 to manage and/or locate a tracking device 106 communicatively coupled to the mobile device 102 via a second network 110 and associated with the user 103. In some configurations, the user 103 may own and register multiple tracking devices 106. Although the embodiment of FIG. 1 illustrates a particular arrangement of the tracking system 100, mobile device 102, and tracking device 106, in other embodiments, other configurations of components can implement the principles described herein.

In some configurations, the user 103 may be part of the community of users. Further, one or more users 103 may own and register one or more tracking devices 106. Thus, any one of the users within the community of users can communicate with the tracking system 100 and leverage the capabilities of the community of users to locate a tracking device 106 that has been lost.

The tracking system 100 and the mobile device 102 may communicate using any communication platforms and technologies suitable for transporting data and/or communication signals, including known communication technologies, devices, media, and protocols supportive of remote data communications.

In certain embodiments, the tracking system 100 and the mobile device 102 communicate via a network 108, which may include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the tracking system 100 and the mobile device 102. The mobile device 102 may also be in communication with a tracking device 106 via a second network 110. The second network 110 may be a similar or different type of network as the first network 108. In some embodiments, the second network 110 comprises a wireless network with a limited communication range, such as a Bluetooth or Bluetooth Low Energy (BLE) wireless network.

As mentioned above, FIG. 1 illustrates the mobile device 102 associated with the user 103. The mobile device 102 can be configured to perform one or more functions described herein with respect to locating tracking devices (e.g., tracking device 106). For example, the mobile device 102 can receive input from the user 103 representative of information about the user 103 and information about a tracking device 106. The mobile device 102 may then provide the received user information, tracking device information, and/or information about the mobile device 102 to the tracking system 100. Accordingly, the tracking system 100 is able to associate the mobile device 102, the user 103, and/or the tracking device 106 with one another.

In some embodiments, the mobile device 102 can communicate with the tracking device 106 and provide information regarding the location of the tracking device to the user 103. For example, the mobile device 102 can detect a communication signal from the tracking device 106 (e.g., by way of second network 110) as well as a strength of the communication signal to determine an approximate distance between the mobile device 102 and the tracking device 106. The mobile device 102 can then provide this information to the user 103 (e.g., by way of one or more graphical user interfaces) to assist the user 103 to locate the tracking device 106. Accordingly, the user 103 can use the mobile device 102 to track and locate the tracking device 106 and a corresponding object associated with the tracking device 106.

If the mobile device 102 is located beyond the immediate range of communication with the tracking device 106 (e.g., beyond the second network 110), the mobile device 102 can be configured to send an indication that a tracking device 106 is lost to the tracking system 100, requesting assistance in finding the tracking device. The mobile device 102 can send an indication of a lost device in response to a command from the user 103. For example, once the user 103 has determined that the tracking device 106 is lost, the user can provide user input to the mobile device 102 (e.g., by way of a graphical user interface), requesting that the mobile device 102 send an indication that the tracking device 106 is lost to the tracking system 100. In some examples, the lost indication can include information identifying the user 103 (e.g., name, username, authentication information), information associated with the mobile device 102 (e.g., a mobile phone number), information associated with the tracking device (e.g., a unique tracking device identifier), or a location of the user (e.g., a GPS location of the mobile device 102 at the time the request is sent).

The tracking system 100 can be configured to provide a number of features and services associated with the tracking and management of a plurality of tracking devices and/or users associated with the tracking devices. For example, the tracking system 100 can manage information and/or user profiles associated with user 103. In particular, the tracking system 100 can manage information associated with the tracking device 106 and/or other tracking devices associated with the user 103.

As mentioned above, the tracking system 100 can receive an indication that the tracking device 106 is lost from the mobile device 102. The tracking system 100 can then process the indication in order to help the user 103 find the tracking device 106. For example, the tracking system 100 can leverage the capabilities of the community mobile devices 104 to help find the tracking device 106. In particular, the tracking system 100 may set a flag for a tracking device 106 to indicate that the tracking device 106 lost and monitor communications received from the community mobile devices 104 indicating the location of one or more tracking devices 106 within proximity of the community mobile devices 104. The tracking system 100 can determine whether a specific location is associated with the lost tracking device 106 and provide any location updates associated with the tracking device 106 to the mobile device 102. In one example, the tracking system may receive constant updates of tracking device 106 locations regardless of whether a tracking device 106 is lost and provide a most recent updated location of the tracking device 106 in response to receiving an indication that the tracking device 106 is lost.

As mentioned above, the tracking system 100 can assist a user 103 in locating a tracking device 106. The tracking device may be a chip, tile, tag, or other device for housing circuitry and that may be attached to or enclosed within an object such as a wallet, keys, purse, car, or other object that the user 103 may track. Additionally, the tracking device 106 may include a speaker for emitting a sound and/or a transmitter for broadcasting a beacon. In one configuration, the tracking device 106 may constantly transmit a beacon signal that may be detected using a nearby mobile device 102 and/or mobile device from a community of users. In some configurations, the tracking device 106 broadcasts a beacon at regular intervals (e.g., one second intervals) that may be detected from a nearby mobile device (e.g., mobile device 102). The strength of the signal emitted from the tracking device 106 may be used to determine a degree of proximity to the mobile device 102 that detects the signal. For example, a higher strength signal would indicate a close proximity between the tracking device 106 and the mobile device 102 and a lower strength signal would indicate a more remote proximity between the tracking device 106 and the mobile device 102. In some cases, the strength of signal or absence of a signal may be used to indicate that a tracking device 106 is lost.

Figure 2:
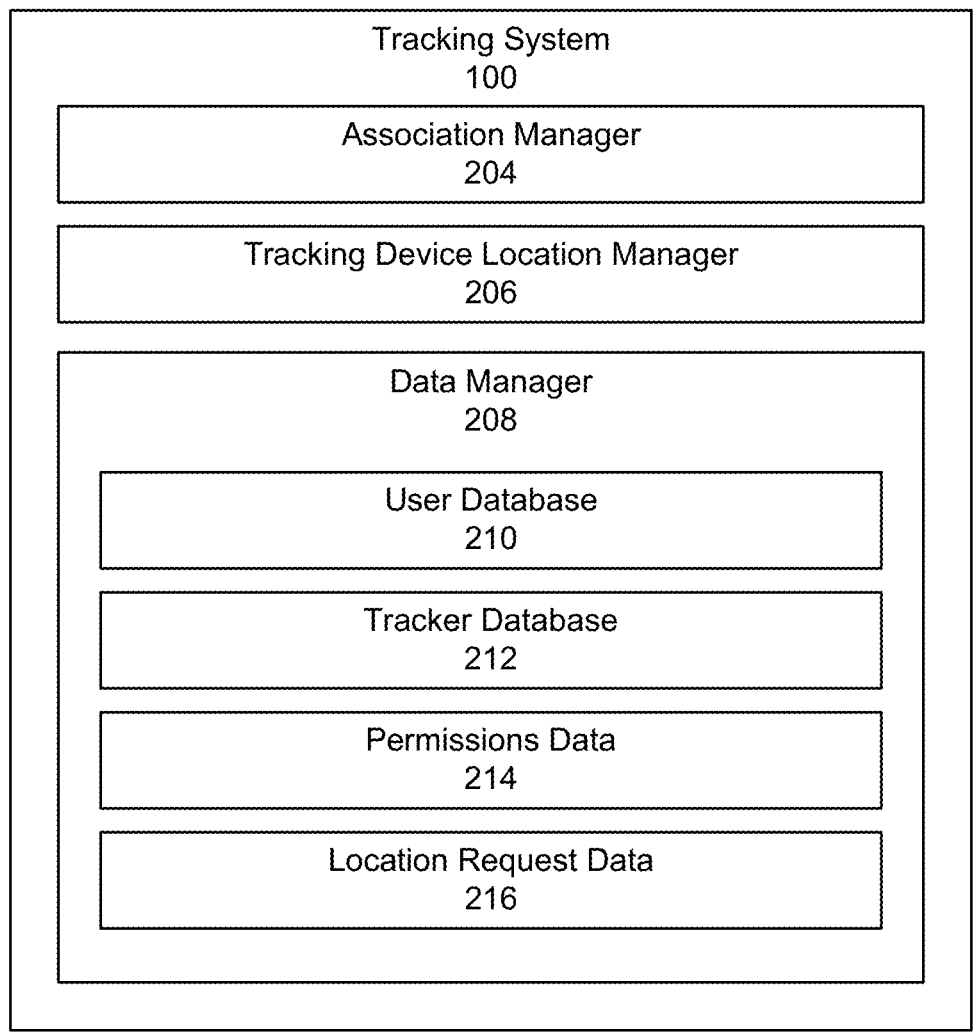
FIG. 2 illustrates an example tracking system of the environment of FIG. 1.

In response to receiving the signals broadcast by the tracking device 106, the mobile device 102 (or any mobile device of another user configured to communication with tracking devices and the tracking system 100) can identify a location associated with the tracking device 106 and can provide the identified location in association with an identity of the tracking device to the tracking system 100. In some embodiments, the providing of a location of the tracking device 106 to the tracking system 100 by a mobile device is done without input by the user, without System Overview FIG. 2 illustrates a diagram showing example components of the tracking system 100. As shown, the tracking system 100 may include, but is not limited to, an association manager 204, a tracking device location manager 206, and a data manager 208, each of which may be in communication with one another using any suitable communication technologies. It will be recognized that although managers 204-208 are shown to be separate in FIG. 2, any of the managers 204-208 may be combined into fewer managers, such as into a single manager, or divided into more managers as may serve a particular embodiment.

The association manager 204 may be configured to receive, transmit, obtain, and/or update information about a user 103 and/or information about one or more specific tracking devices (e.g., tracking device 106). In some configurations, the association manager 204 may associate information associated with a user 103 with information associated with a tracking device 106. For example, user information and tracking information may be obtained by way of a mobile device 102, and the association manager 204 may be used to link the user information and tracking information. The association between user 103 and tracking device 106 may be used for authentication purposes, or for storing user information, tracking device information, permissions, or other information about a user 103 and/or tracking device 106 in a database.

The tracking system 100 also includes a tracking device location manager 206. The tracking device location manager 206 receives locations associated with a tracking device (such as locations provided by a mobile device communicatively coupled to the tracking device), and can store the received locations as "pre-lost" locations within a location history associated with the tracking device, for instance in the tracker database 212. The tracking device location manager 206 can also receive locations from the mobile device indicating that the tracking device is lost, and can store these locations as "post-lost" locations within the location history. Each location within the location history can be stored with a flag or status indicating that the location is a pre-lost location or a post-lost location. It should be noted that as used herein, the storage or locations can refer to the storage of GPS coordinates, latitude/longitude coordinates, or any other suitable location format.

The tracking device location manager 206 may receive and process an indication that the tracking device 106 is lost from a mobile device (e.g., mobile device 102). For example, the tracking system 100 may receive a lost indication from a mobile device 102 indicating that the tracking device 106 is lost. The tracking device location manager 206 may set a flag on a database (e.g., tracker database 212) indicating that the tracking device 106 is lost. The tracking device location manager 206 may also query a database to determine tracking information corresponding to the associated user 103 and/or tracking device 106. The tracking system 100 may obtain tracking device information and provide the tracking device information or other information associated with the tracking device 106 to a plurality of community mobile devices to be on alert for the lost or unavailable tracking device 106.

In response to receiving an indication from a mobile device 102 that a tracking device 106 is lost, the tracking device location manager 206 can access a location history associated with the tracking device and can provide the location history to the mobile device. For example, the tracking device location manager 206 can access a threshold number of pre-lost locations, a threshold number of post-lost locations, and a last known location associated with the tracking device 106, and can provide these locations to the mobile device 102 for display, for instance within a map interface.

The tracking device location manager 206 may further manage providing indications about whether a tracking device 106 is lost or not lost. For example, as discussed above, the tracking device location manager 206 may provide a location request to the community of mobile devices indicating that a tracking device 106 is lost. Additionally, upon location of the tracking device 106 by the user 103, the tracking device location manager 206 may provide an indication to the user 103 or the tracking system 100 that the tracking device 106 has been found, thus removing any flags associated with a tracking device and/or canceling any location request previously provided to the community of users. For example, where a user 103 sends an indication that the tracking device 106 is lost to the tracking system 100 and later finds the tracking device 106, the mobile device 102 may provide an indication to the tracking system 100 that the tracking device 106 has been found. In response, the tracking device location manager 206 may remove a flag indicating that the tracking device 106 is lost and/or provide an updated indication to the community of users that the tracking device 106 has been found, thus canceling any instructions associated with the previously provided location request.

In some configurations, the notification that the tracking device 106 has been found may be provided automatically upon the mobile device 102 receiving a signal from the tracking device 106. Alternatively, the notification that the tracking device 106 has been found may be provided by the user 103 via user input on the mobile device 102. In another example, a known user (e.g., a friend or family member) with whom the tracking device 106 has been shared may provide an indication that the tracking device 106 has been found.

The tracking system 100 additionally includes a data manager 208. The data manager 208 may store and manage information associated with users, mobile devices, tracking devices, permissions, location requests, and other data that may be stored and/or maintained in a database related to performing location services of tracking devices. As shown, the data manager 208 may include, but is not limited to, a user database 210, a tracker database 212, permissions data 214, and location request data 216. It will be recognized that although databases and data within the data manager 208 are shown to be separate in FIG. 2, any of the user database 210, tracker database 212, permissions data 214, and location request data 216 may be combined in a single database or manager, or divided into more databases or managers as may serve a particular embodiment.

The data manager 208 may include the user database 210. The user database 210 may be used to store data related to various users. For example, the user database 210 may include data about the user 103 as well as data about each user in a community of users. The community of users may include any user that has provided user information to the tracking system 100 via a mobile device 102 or other electronic device. The user information may be associated with one or more respective tracking devices 106, or may be stored without an association to a particular tracking device. For example, a community user may provide user information and permit performance of tracking functions on the community mobile device without owning or being associated with a tracking device 106. The user database 210 may also include information about one or more mobile devices or other electronic devices associated with a particular user.

The data manager 208 may also include a tracker database 212. The tracker database 212 may be used to store data related to tracking devices. For example, the tracker database 212 may include location data or a location history for any tracking device 106 that has been registered with the tracking system 100. Location data may include unique tracking device identifiers (IDs), pre-lost and post-lost locations associated with each tracking device ID, last known locations associated with each tracking device ID, timestamps associated with stored locations, and the like. Additionally, the tracker database 212 may include any flags or other indications associated with whether a specific tracking device 106 has been marked as lost and whether any incoming communications with regard to that tracking device 106 should be processed based on the presence of a flag associated with the tracking device 106.

The data manager 208 may further include permissions data 214 and location request data 216. Permissions data 214 may include levels of permissions associated with a particular user 103 and/or tracking device 106. For example, permissions data 214 may include additional users that have been indicated as sharing a tracking device 106, or who have been given permission to locate a tracking device 106 using an account and/or mobile device 102 associated with the user 103. Location request data 216 may include information related to a location request or a lost indication received from the user 103 via a mobile device 102.

Figure 3:
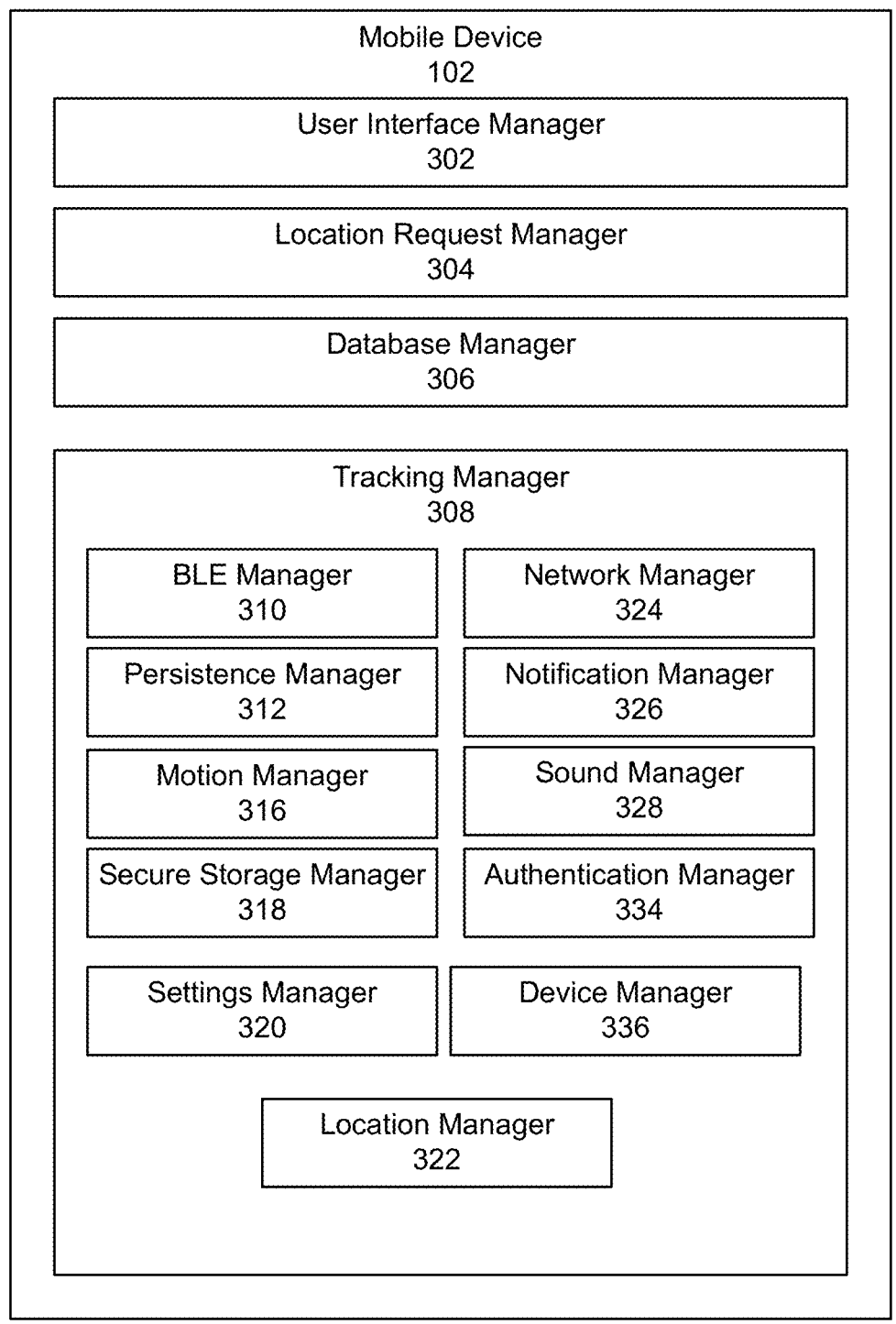
FIG. 3 illustrates an example mobile device of the environment of FIG. 1.

FIG. 3 illustrates a diagram showing example components of the mobile device 102. As shown, the mobile device 102 may include, but is not limited to, a user interface manager 302, a location request manager 304, a database manager 306, and a tracking manager 308, each of which may be in communication with one another using any suitable communication technologies. It will be recognized that although managers 302-308 are shown to be separate in FIG. 3, any of the managers 302-308 may be combined into fewer managers, such as into a single manager, or divided into more managers as may serve a particular embodiment.

As will be explained in more detail below, the mobile device 102 includes the user interface manager 302. The user interface manager 302 may facilitate providing the user 103 access to data on a tracking system 100 and/or providing data to the tracking system 100. Further, the user interface manager 302 provides a user interface by which the user 103 may communicate with tracking system 100 and/or tracking device 106 via mobile device 102.

In one embodiment, the user interface manager 302 provides the user 103 with a map interface for tracing a location history of a tracking device. When a mobile device 102 receives a location history for a tracking device from a tracking system 100, the user interface manager 302 displays the locations to the user on a map. Each location from the location history can be indicated by a pin placed on the map. The map interface can include a timeline with a slider interface. When the user selects a timeframe using the slider interface, only the locations corresponding to times within the selected timeframe are shown on the map. The location indicators on the map may be color coded based on whether each location is a pre-lost or a post-lost location. The map interface is described below in greater detail.

The mobile device 102 may also include a location request manager 304. The location request manager 304 may receive and process a request input to the mobile device 102 to send an indication that a tracking device 106 is lost to a tracking system 100. For example, the user 103 may provide an indication that a tracking device 106 is lost, unreachable, or otherwise unavailable from the mobile device 102 via the user interface manager 302, and the location request manager 304 may process the lost indication and provide any necessary data to the tracking system 100 for processing and relaying a location request to other users 105 over a network 108. In some configurations, an indication that a tracking device 106 is lost is provided via user input. Alternatively, the indication may be transmitted automatically in response to the mobile device 102 determining that a tracking device 106 is lost (for instance, after the passage of a threshold period of time without receiving a signal from the tracking device).

The mobile device 102 may also include a database manager 306. The database manager 306 may maintain data related to the user 103, tracking device 106, permissions, or other data that may be used for locating a tracking device 106 and/or providing a request to a tracking system 100 for locating one or more tracking devices 106 associated with the user 103. Further, the database manager 306 may maintain any information that may be accessed using any other manager on the mobile device 102.

The mobile device 102 may further include a tracking manager 308. The tracking manager 308 may include a tracking application (e.g., a software application) for communicating with and locating a tracking device 106 associated with the user 103. For example, the tracking manager 308 may be one configuration of a tracking application installed on the mobile device 102 that provides the functionality for locating a tracking device 106 and/or requesting location of a tracking device 106 using a plurality of community mobile devices 104. As shown, the tracking manager 308 may include, but is not limited to, a Bluetooth Low Energy (BLE) manager 310, a persistence manager 312, a local files manager 314, a motion manager 316, a secure storage manager 318, a settings manager 320, a location manager 322, a network manager 324, a notification manager 326, a sound manager 328, a friends manager 330, a photo manager 332, an authentication manager 334, and a device manager 336. Thus, the tracking manager 308 may perform any of the functions associated with managers 310-338, described in additional detail below.

The BLE manager 310 may be used to manage communication with one or more tracking devices 106. The persistence manager 312 may be used to store logical schema information that is relevant to the tracking manager 308. The local files manager 314 may be responsible for managing all files that are input or output from the mobile device 102. The motion manager 316 may be responsible for all motion management required by the tracking manager 308. The secure storage manager may be responsible for storage of secure data, including information such as passwords and private data that would be accessed through this sub-system. The settings manager 320 may be responsible for managing settings used by the tracking manager 308. Such settings may be user controlled (e.g., user settings) or defined by the tracking manager 308 for internal use (e.g., application settings) by a mobile device 102 and/or the tracking system 100.

The location manager 322 may be responsible for all location tracking done by the tracking manager 308. For example, the location manager 322 may manage access to the location services of the mobile device 102 and works in conjunction with other managers to persist data. The network manager 324 may be responsible for all Internet communications from the tracking manager 308. For example, the network manager 324 may mediate all Internet API calls for the tracking manager 308. The notification manager 326 may be responsible for managing local and push notifications required by the tracking manager 308.

The sound manager 328 may be responsible for playback of audio cues by the tracking manager 308. The friends manager 330 may be responsible for managing access to contacts and the user's social graph. The photo manager 332 may be responsible for capturing and managing photos used by the tracking manager 308. The authentication manager 334 may be responsible for handling the authentication (e.g., sign in or login) of users. The authentication manager 334 may also include registration (e.g., sign up) functionality. The authentication manager 334 further coordinates with other managers to achieve registration functionality. The device manager 336 may be responsible for managing the devices discovered by the tracking manager 308. The device manager 336 may further store and/or maintain the logic for algorithms related to device discovery and update.

Location History of a Lost Tracking Device

Figure 4:
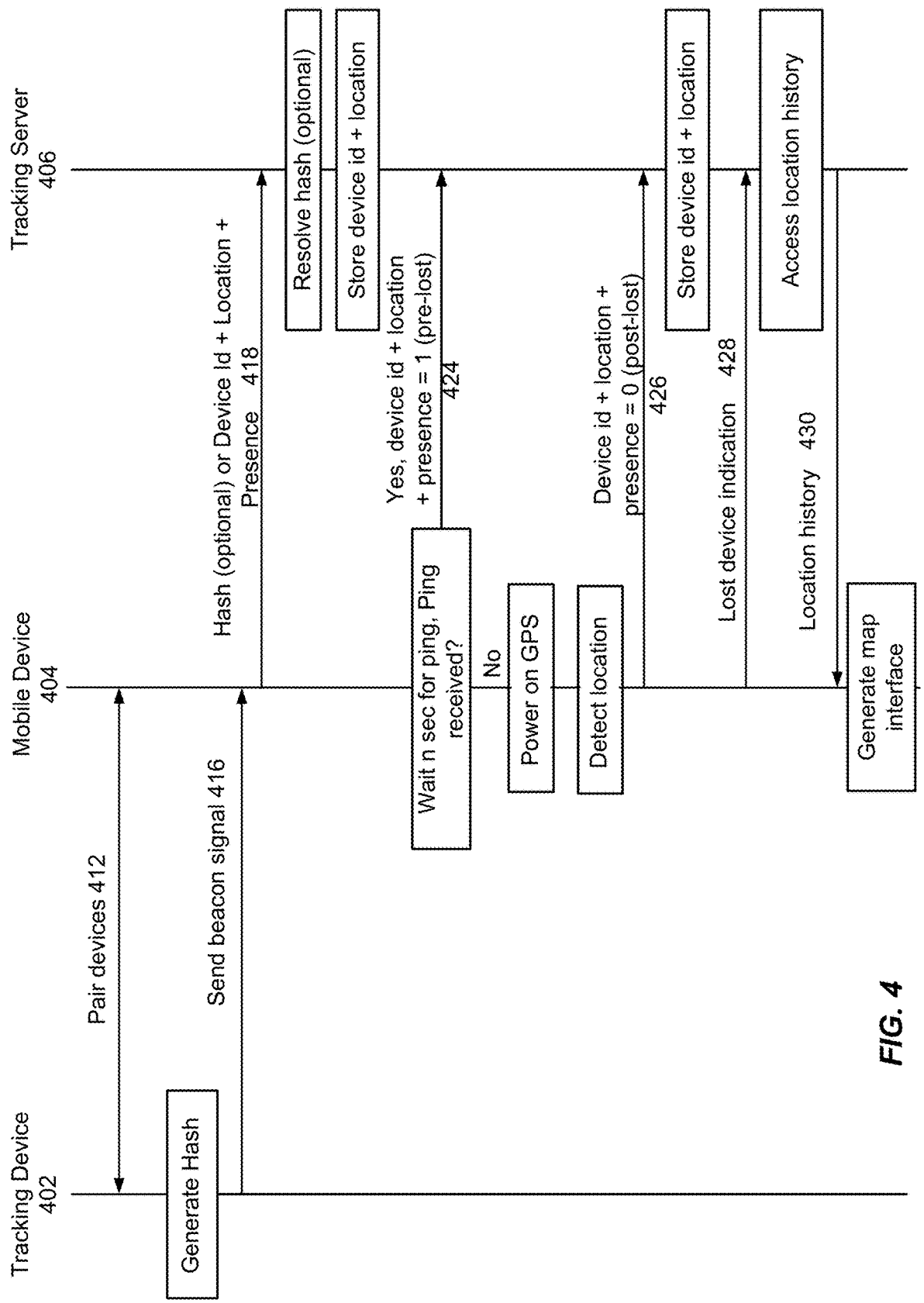
FIG. 4 illustrates a process of determining a location history of a lost tracking device, according to one embodiment.

FIG. 4 illustrates a process of determining a location history of a lost tracking device, according to one embodiment. A mobile device 404 pairs 412 with a tracking device 402, for instance using the Bluetooth protocol. The tracking device 402 can generate a hash value identifying the tracking device, and can include the hash value in a beacon signal sent 416 to the mobile device. As used herein, beacon signals can also be referred to as "advertisements", and can include one or more tracking device parameters in addition to a hash value, such as a timestamp corresponding to the beacon signal. In some embodiments, instead of including a hash value within the beacon signal, the tracking device 402 includes an identifier that uniquely identifies the tracking device to the mobile device 404 or the tracking server 406.

In one embodiment, the tracking device 402 outputs beacon signals at a predetermined periodic interval of time or in response to a sensed motion of the tracking device 402. In some embodiments, the hash value generated by the tracking device 402 can be dependent on one or more parameters associated with the tracking device, including but not limited to one or more of the following: a key stored by the tracking device, the MAC address of the tracking device (random or assigned to the tracking device by a tracking server, such as the tracking system 100 of FIG. 1), a device identifier (such as a persistent identifier that uniquely identifies the tracking device), a time at which the hash value is generated, a location of the tracking device 402, or any other suitable parameters. By generating a hash value based on a time at which the hash value is generated, the hash value can expire after a threshold amount of time elapses, or after the passage of a pre-defined time interval, as described below.

The tracking device 402 can generate a hash value (or, in some embodiments, a keyed-hash value) using any suitable hashing function, such the SHA-X function, the MDX function, the RIPEMD function, the PANAMA function, the Tiger function, the WHIRLPOOL function, the Bernstein hash function, the Fowler-Noll-Vo hash function, the Jenkins hash function, the Pearson hash function, the Zobrist hash function, and the like. A keyed-hash message authentication code (HMAC) construction can be used for calculating the keyed-hash. Although hash functions are described herein, in other embodiments, the tracking device 402 is configured to generate an encrypted or otherwise encoded value based on one or more device parameters using any suitable encryption or encoding function, or as described above, can output a unique identifier associated with the tracking device in plaintext or otherwise without data protection.

The mobile device 404, in response to receiving the beacon signal, attempts to resolve a hash value included within the beacon signal to determine an identity of the tracking device. The mobile device 404 further determines the location of the tracking device and the timestamp associated with the beacon signal. The mobile device 404 provides 418 an identifier associated with the tracking device 402, the location of the tracking device, and the determined timestamp to the tracking server 406. In addition, the mobile device can provide an unresolved hash value to the tracking server 406 in the event that the mobile device is unable to resolve the hash value. In such embodiments, the tracking server 406 can resolve the hash value to obtain the identity of the tracking device 402. Finally, the mobile device also provides a flag indicating that the tracking device 402 is not lost, and that the provided location is a "pre-lost" location. The tracking server 406 stores the identity of the tracking device 402 in association with the determined location, the determined timestamp, and the presence flag indicating that the determined location is a pre-lost location. It should be noted that the tracking server 406 can receive and store a number of pre-lost locations associated with the tracking device 402, for instance within a location history associated with the tracking device (identified using the received device identifier).

At any given time, the mobile device 404 may lose a connection with the tracking device 402. This can be due to multiple reasons, for example, the mobile device 404 may be out of range of the tracking device 402, the communication services on the mobile device 404 may be disabled, and the like. In such embodiments, the mobile device 404 detects the loss of connection with the tracking device 402. In one embodiment, the mobile device 404 detects the loss of connection with the tracking device by waiting for a predetermined threshold time to receive advertisement packets from the tracking device 402. If no advertisement packets are received during the threshold time, the mobile device 404 can determine that the connection between the tracking device 402 and the mobile device 404 has been severed, and can classify the tracking device as lost.

Once the mobile device 404 determines that the connection to the tracking device 402 is lost, the location service (e.g., a GPS receiver) on the mobile device is activated, the mobile device determines its location using the location service, and the mobile provides the determined location to the tracking server 406. For example, the mobile device 404 can provide 426 the determined location, a timestamp associated with the determined location, an identity of the tracking device 402, and a flag indicating that the location is a post-lost location to the tracking server 406. The tracking server 406 stores the location in associated with the device identity and the post-lost flag. It should be noted that the mobile device 404 can provide post-lost locations to the tracking server 406 periodically. In addition, the tracking server 406 can be configured to store the post-lost locations in conjunction with stored pre-lost locations associated with the tracking device 402 within a location history associated with the tracking device (for instance, a location history identified using the received device identifier).

In some embodiments, to avoid redundancy of location information for a tracking device, the tracking server 406 may run a search for a received location. If the location already exists, the location may not be stored again, but the timestamp for the location may be updated. In another embodiment, the number of locations stored for a tracking device may be limited by a predetermined time threshold, e.g. location history for a tracking device may be stored only for the past 24 hours.

Once a user of a mobile device realizes that the tracking device 402 is lost, the user can mark the device as lost, for instance via an application installed on the mobile device 404. The mobile device 404 provides 428 an indication that the tracking device 402 is lost, and, in response, the tracking server 406 accesses the stored location history associated with the tracking device. The location history includes a set of pre-lost locations and post-lost locations, and is provided 430 by the tracking server 406 to the mobile device 404. The mobile device 404 presents the location history to the user via a map interface, such as the map interface of FIGS. 5A-5C, beneficially enabling a user to digitally re-trace the steps of the user, and allowing the user to identify a location where the tracking device 402 was lost.

Figure 5A:
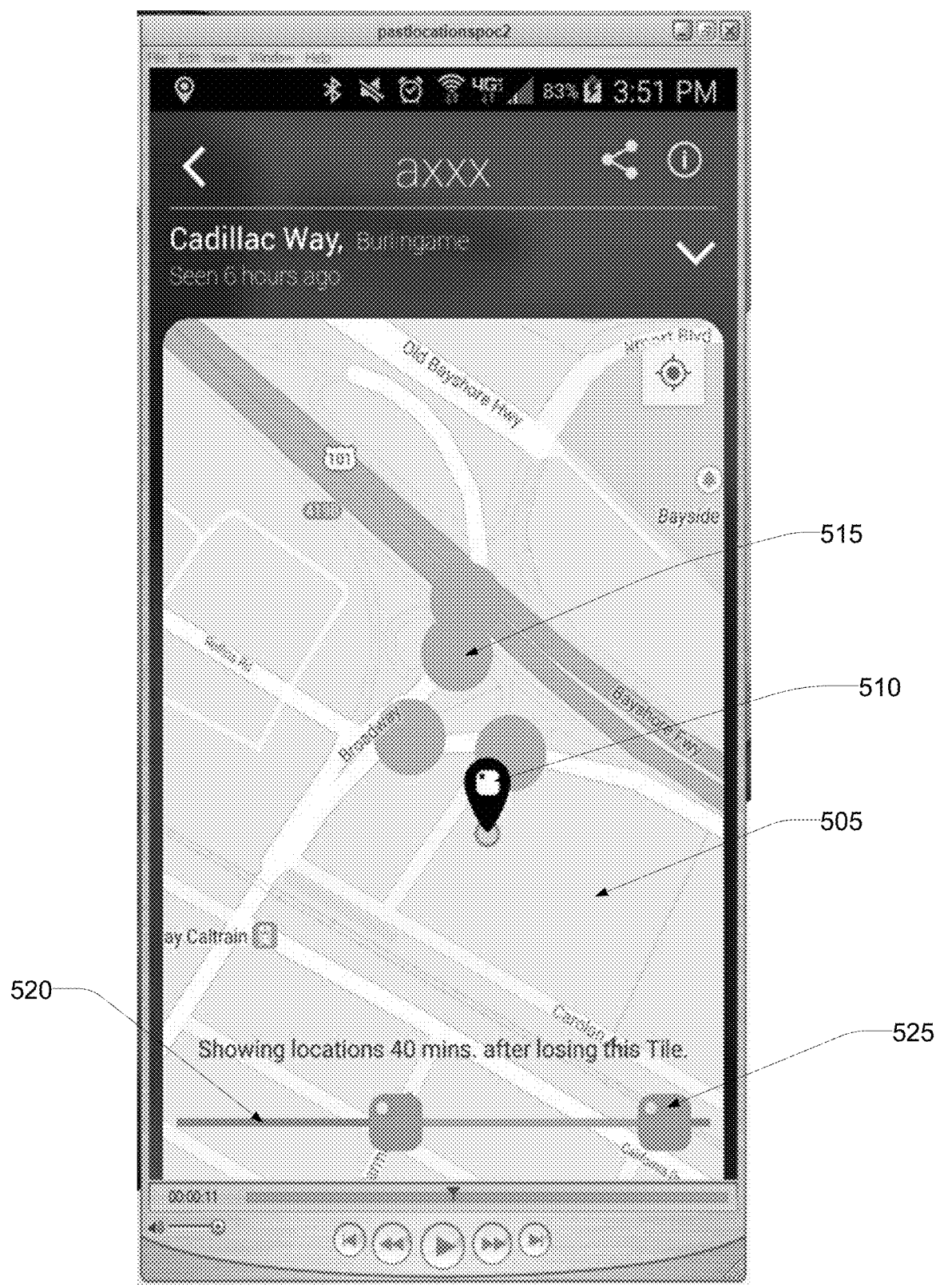
FIG. 5A-5C illustrate an example map interface showing a location history of a lost tracking device, according to one embodiment.
Figure 5B:
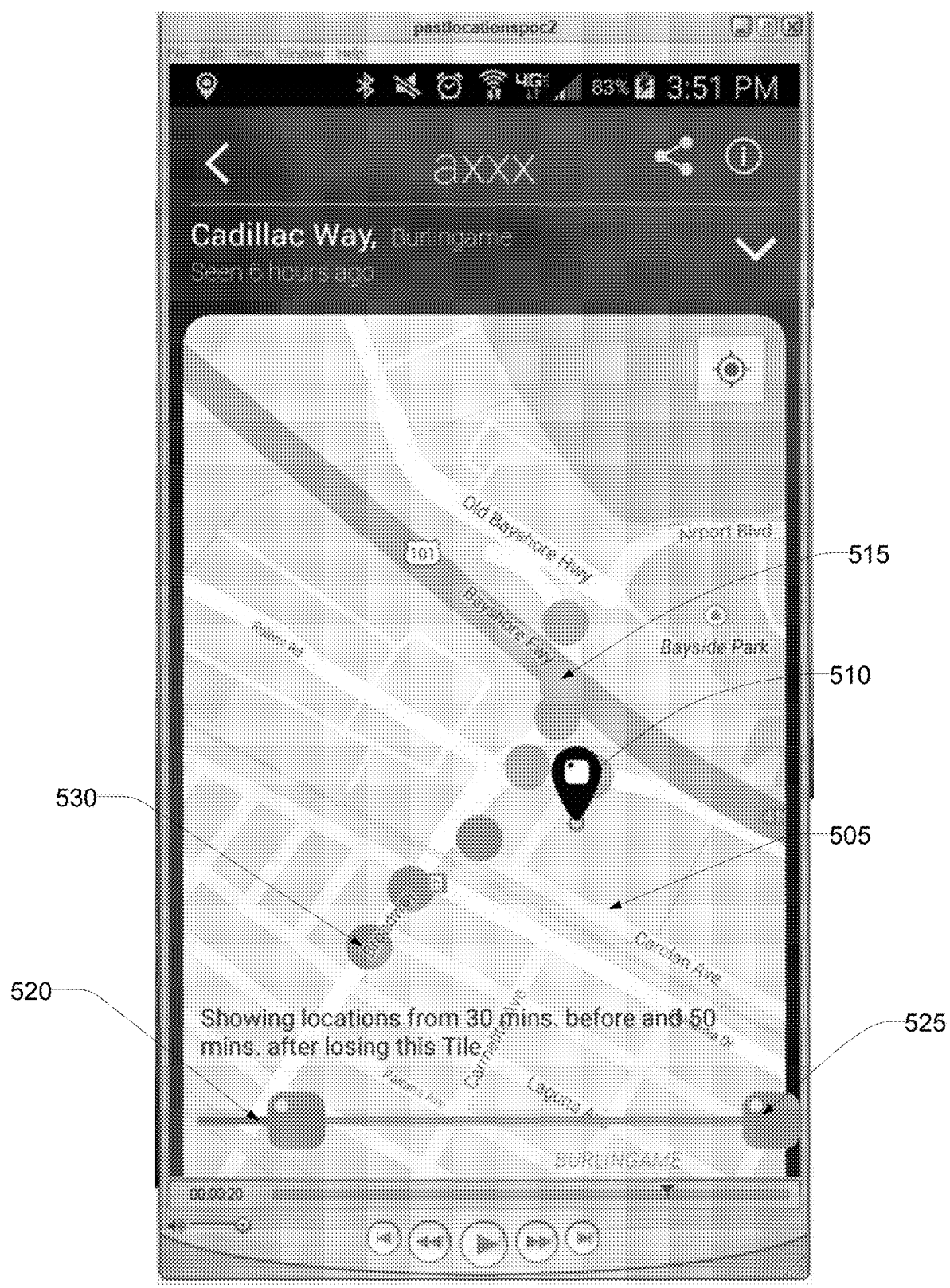
Figure 5C:
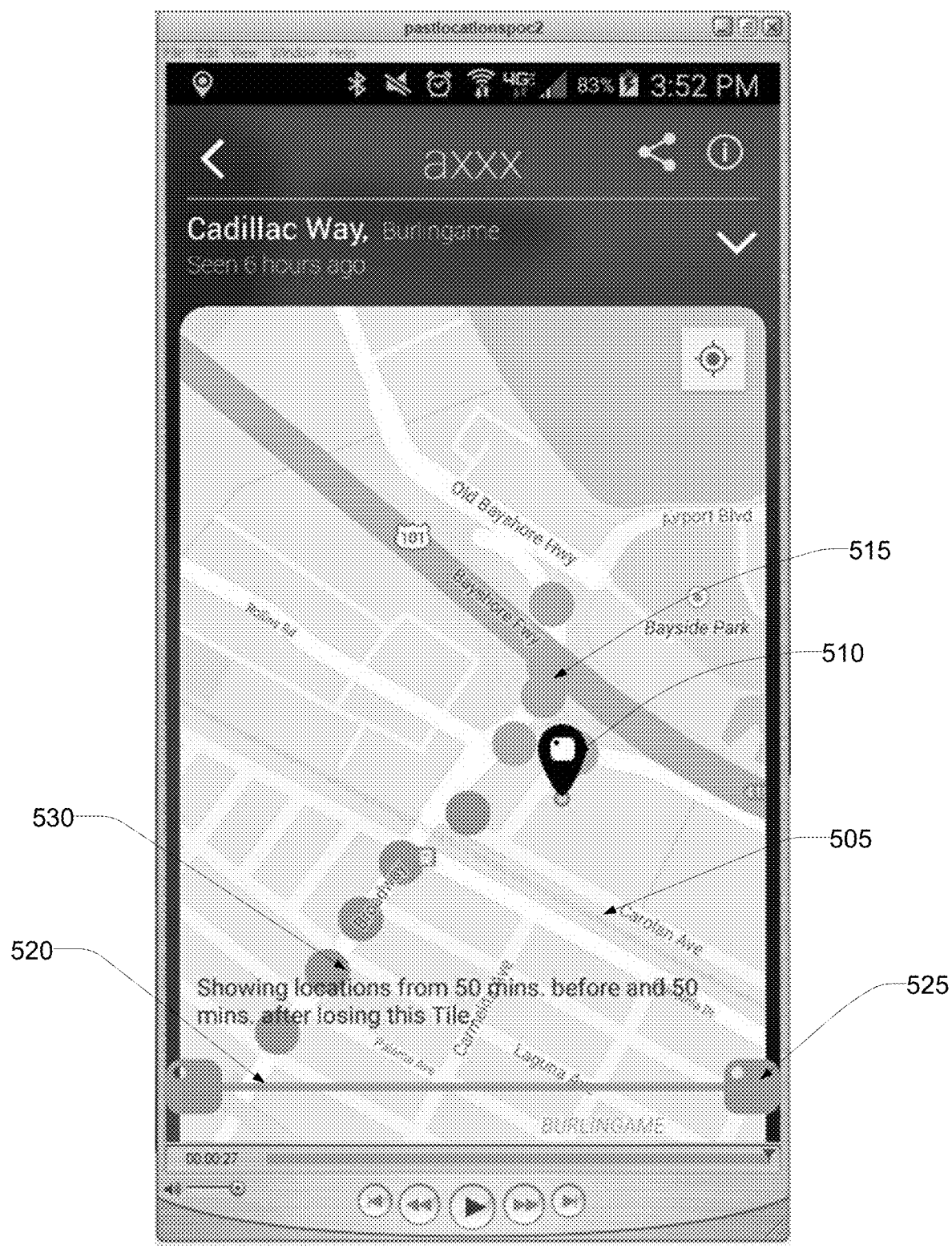

FIGS. 5A-5C illustrate an example map interface showing a location history of a lost tracking device, according to one embodiment. FIG. 5A illustrates an example map interface showing post-lost locations of the tracking device. The map interface includes an electronic map 505 showing the location history associated with the tracking device and the mobile device. The pin with a tracking device icon 510 indicates the last known location of the tracking device. Each post-lost location 515 is pinned on the map at the geographical coordinates of the location on the electronic map 505. Additionally, the post-location pins 515 may be represented by a different color than the color of the last known location pin 510.

The user interface includes a timeline 520 that has multiple tracking device icons 525 on it ("slider interface" herein). A user can slide the tracking device icons 525 along the timeline 520 to select a timeframe within the timeline.

The timeline 520 represents a range of timestamps of the pre-lost and post-lost locations in the location history. For example, the left most location on the timeline 520 may correspond to the earliest known pre-lost location of the tracking device 402. The right most location on the timeline 520 may correspond to the last known post-lost location of the mobile device 404. The center of the timeline 520 may represent the last known location 510 of the tracking device 402, i.e. the last known pre-lost location of the tracking device 402. A user can use touch gestures on the mobile device display to slide the tracking device icons 525 along the on the timeline 520 to select a timeframe within the timeline (e.g., a starting time and an ending time). In response to the touch gesture, the user interface manager 302 determines the starting time and ending time of the timeframe based on the location of the tracking device icons 525 along the timeline. The user interface manager 302 displays the locations within the location history on the electronic map 505 that correspond to the selected timeframe. In addition the user interface manager 302 can display a notification or message representative of the selected timeframe. In the embodiment of FIG. 5A, the selected timeframe spans from a starting time corresponding to the last known location of the tracking device to an ending time of 40 minutes after the starting time, and the displayed message is "Showing locations 40 mins. After losing this Tile" (where "Tile" represents the tracking device).

FIG. 5B illustrates an example map interface that shows some pre-lost locations and all post-lost locations of the tracking device within the illustrated timeline 520. Each pre-lost location 530 and post-lost location 515 is pinned on the map at the associated geographical coordinates on the electronic map 505. Additionally, the pre-lost location pins 530 and the post-location pins 515 may each be represented by a different color, and by a different color than the pin associated with the last known location pin 510. In embodiment of FIG. 5B, the icon 525 associated with the starting time of the selected time frame is moved to include some but not all of the portion of the timeline before the last known location of tracking device, and the icon 525 associated with the ending time of the selected time frame is moved to include all of the timeline after the last known location of the tracking device, and in response, the pre-lost and post-lost locations associated with the selected timeframe are displayed within the map interface.

FIG. 5C illustrates an example map interface that shows all pre-lost locations and all post-lost locations of the tracking device (i.e., the entire location history of the tracking device 402 and the associated mobile device 404 that was available to the tracking server 406). Each pre-lost location 530 and post-lost location 515 is pinned on the map at the corresponding geographical coordinates on the electronic map 505.

In this example, the user slides the tracking device icons 525 to each end of the timeline in order to select the entire timeline as the displayed timeframe. A user can view the map interface of FIG. 5C and determine that the tracking device 402 was at five different locations before it lost connection with the mobile device 404. These five locations were tracked in a time interval of 50 minutes. The user can also view the map interface of FIG. 5C, and can determine that the mobile device 404 was at five locations after the user lost the tracking device 402. This map interface allows the user to digitally retrace steps to identify the path traveled by the user, beneficially enabling the user to identify the last known location of the tracking device, and enabling the user to identify a likely location of the lost tracking device based on the path traveled by the user.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for locating a tracking device comprising:
   accessing, from a tracking server, a first set of locations of a mobile device when it was connected to the tracking device and a subsequent second set of locations of the mobile device when it was not connected to the tracking device;
   in response to a user associated with the tracking device marking the tracking device as lost via an application running on a client device and the tracking server subsequently flagging the tracking device as lost, displaying, by the client device, a map interface of a geographic area including the first set of locations and the second set of locations;
   modifying, by the client device, the map interface to display the first set of locations and the second set of locations by animating the display of a path of the mobile device before and after the mobile device disconnects from the tracking device, the displayed path comprising the first set of locations and the second set of locations displayed within the map interface in an order based on timestamps associated with each location in the first set of locations and the second set of locations, wherein the map interface includes a first interface element enabling the user to select a starting time and a second interface element enabling the user to select an ending time, and wherein the displayed path only includes locations within the first set of locations and the second set of locations associated with timestamps that fall between the starting time and the ending time; and
   further modifying, by the client device, the map interface to display text identifying one or both of a first length of time between the starting time and a time that the tacking device was lost and a second length of time between the time the tracking device was lost and the ending time, and indicating that only locations within the first length of time or second length of time are shown within the map interface.

2. The method of claim 1, wherein the interface elements include a slider bar configured to enable the user to control the locations displayed within the map interface.

3. The method of claim 2, wherein the locations displayed within the map interface element are modified in real-time in response to a change in either or both of the starting time or the ending time.

4. The method of claim 2, wherein the map interface further displays text identifying the starting time and the ending time.

5. The method of claim 1, wherein each location within the first set of locations displayed within the map interface is represented by a first visual indication indicating that the mobile device was connected to the tracking device at the location within the first set of locations.

6. The method of claim 5, wherein each location within the second set of locations displayed within the map interface is represented by a second visual indication indicating that the mobile device was not connected to the tracking device at the location within the second set of locations.

7. The method of claim 1, wherein the map interface further displays a visual indication representative of a location at which the mobile device disconnected from the tracking device.

8. The method of claim 1, wherein the first set of locations are displayed within the map interface using a first icon or first color indicating a connection between the tracking device and the mobile device, and wherein the second set of locations are displayed within the map interface using a second icon or second color indicating a lack of connection between the tracking device and the mobile device.

9. A non-transitory computer-readable storage medium storing executable computer instructions for locating a tracking device, the instructions, when executed by a hardware processor, configured to cause the processor to perform steps comprising:
   accessing, from a tracking server, a first set of locations of a mobile device when it was connected to the tracking device and a subsequent second set of locations of the mobile device when it was not connected to the tracking device;
   in response to a user associated with the tracking device marking the tracking device as lost via an application running on a client device and the tracking server subsequently flagging the tracking device as lost, displaying, by the client device, a map interface of a geographic area including the first set of locations and the second set of locations;
   modifying, by the client device, the map interface to display the first set of locations and the second set of locations by animating the display of a path of the mobile device before and after the mobile device disconnects from the tracking device, the displayed path comprising the first set of locations and the second set of locations displayed within the map interface in an order based on timestamps associated with each location in the first set of locations and the second set of locations, wherein the map interface includes a first interface element enabling the user to select a starting time and a second interface element enabling the user to select an ending time, and wherein the displayed path only includes locations within the first set of locations and the second set of locations associated with timestamps that fall between the starting time and the ending time; and
   further modifying, by the client device, the map interface to display text identifying one or both of a first length of time between the starting time and a time that the tacking device was lost and a second length of time between the time the tracking device was lost and the ending time, and indicating that only locations within the first length of time or second length of time are shown within the map interface.

10. The non-transitory computer-readable storage medium of claim 9, wherein the interface elements include a slider bar configured to enable the user to control the locations displayed within the map interface.

11. The non-transitory computer-readable storage medium of claim 10, wherein the locations displayed within the map interface element are modified in real-time in response to a change in either or both of the starting time or the ending time.

12. The non-transitory computer-readable storage medium of claim 10, wherein the map interface further displays text identifying the starting time and the ending time.

13. The non-transitory computer-readable storage medium of claim 9, wherein each location within the first set of locations displayed within the map interface is represented by a first visual indication indicating that the mobile device was connected to the tracking device at the location within the first set of locations.

14. The non-transitory computer-readable storage medium of claim 13, wherein each location within the second set of locations displayed within the map interface is represented by a second visual indication indicating that the mobile device was not connected to the tracking device at the location within the second set of locations.

15. The non-transitory computer-readable storage medium of claim 9, wherein the map interface further displays a visual indication representative of a location at which the mobile device disconnected from the tracking device.

16. The non-transitory computer-readable storage medium of claim 9, wherein the first set of locations are displayed within the map interface using a first icon or first color indicating a connection between the tracking device and the mobile device, and wherein the second set of locations are displayed within the map interface using a second icon or second color indicating a lack of connection between the tracking device and the mobile device.

17. A system for locating a tracking device comprising:
accessing, from a tracking server, a first set of locations of a mobile device when it was connected to the tracking device and a subsequent second set of locations of the mobile device when it was not connected to the tracking device;
in response to a user associated with the tracking device marking the tracking device as lost via an application and the tracking server subsequently flagging the tracking device as lost, displaying a map interface of a geographic area including the first set of locations and the second set of locations;
modifying the map interface to display the first set of locations and the second set of locations by animating the display of a path of the mobile device before and after the mobile device disconnects from the tracking device, the displayed path comprising the first set of locations and the second set of locations displayed within the map interface in an order based on timestamps associated with each location in the first set of locations and the second set of locations, wherein the map interface includes a first interface element enabling the user to select a starting time and a second interface element enabling the user to select an ending time, and wherein the displayed path only includes locations within the first set of locations and the second set of locations associated with timestamps that fall between the starting time and the ending time; and
further modifying the map interface to display text identifying one or both of a first length of time between the starting time and a time that the tacking device was lost and a second length of time between the time the tracking device was lost and the ending time, and indicating that only locations within the first length of time or second length of time are shown within the map interface.

18. The system of claim 17, wherein the first set of locations are displayed within the map interface using a first icon or first color indicating a connection between the tracking device and the mobile device, and wherein the second set of locations are displayed within the map interface using a second icon or second color indicating a lack of connection between the tracking device and the mobile device.

* * * * *